(12) United States Patent
Pratt et al.

(10) Patent No.: US 11,281,796 B2
(45) Date of Patent: Mar. 22, 2022

(54) BLOCKCHAIN BASED INFORMATION MANAGEMENT

(71) Applicant: AT&T Intellectual Property I, L.P., Atlanta, GA (US)

(72) Inventors: James Pratt, Round Rock, TX (US); Nigel Bradley, McDonough, GA (US); Eric Zavesky, Austin, TX (US); Nikhil Marathe, Palatine, IL (US); Timothy Innes, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 243 days.

(21) Appl. No.: 16/007,747

(22) Filed: Jun. 13, 2018

(65) Prior Publication Data

US 2019/0384932 A1     Dec. 19, 2019

(51) Int. Cl.
*G06F 21/62* (2013.01)
*H04L 29/06* (2006.01)
*G06Q 50/26* (2012.01)

(52) U.S. Cl.
CPC ....... *G06F 21/6245* (2013.01); *G06Q 50/265* (2013.01); *H04L 63/0428* (2013.01)

(58) Field of Classification Search
CPC .............. G06F 21/6245; G06Q 50/265; H04L 63/0428
USPC ........................................................ 713/164
See application file for complete search history.

(56) References Cited

U.S. PATENT DOCUMENTS

| 6,449,651 B1* | 9/2002 | Dorfman | G06F 21/305 235/382 |
| 6,795,905 B1* | 9/2004 | Ellison | G06F 12/1491 711/121 |
| 9,898,781 B1 | 2/2018 | Silverman | |
| 2002/0002541 A1* | 1/2002 | Williams | G06F 21/10 705/51 |
| 2003/0056092 A1* | 3/2003 | Edgett | G06F 21/31 713/153 |

(Continued)

FOREIGN PATENT DOCUMENTS

| CN | 106897878 A | 6/2017 |
| WO | 2015070246 A2 | 5/2015 |

OTHER PUBLICATIONS

Wood,"ETHEREUM: A Secure Decentralised Generalised Transaction Ledger", Sep. 30, 2017, pp. 1-34 (Year: 2017).*

*Primary Examiner* — Taghi T Arani
*Assistant Examiner* — Gregory A Lane
(74) *Attorney, Agent, or Firm* — Amin, Turocy & Watson, LLP

(57) ABSTRACT

Techniques are disclosed herein for managing and sharing sensitive information using blockchain technology. In certain embodiments, a transaction may be generated using information and a set of conditions, wherein satisfying the set of conditions by a requester of the information determines access to the information by the requester and the set of conditions include a count for a number of queries allowed for accessing the information. As requesters access the information, the count is decremented or adjusted and updated transactions are stored on the blockchain ledger until the count adjusts to a predetermined number, such zero. The information and the set of conditions may be defined by the user.

19 Claims, 6 Drawing Sheets

(56) References Cited

U.S. PATENT DOCUMENTS

| | | | |
|---|---|---|---|
| 2011/0004943 A1* | 1/2011 | Chaganti | H04L 63/06 |
| | | | 726/30 |
| 2014/0283142 A1* | 9/2014 | Shepherd | G06F 21/6245 |
| | | | 726/30 |
| 2017/0091750 A1 | 3/2017 | Maim | |
| 2017/0287068 A1 | 10/2017 | Nugent | |
| 2017/0366516 A1* | 12/2017 | Pattanaik | H04L 9/3236 |
| 2018/0040007 A1 | 2/2018 | Lane et al. | |
| 2018/0041446 A1 | 2/2018 | Way | |
| 2018/0041486 A1 | 2/2018 | Way | |
| 2018/0082296 A1* | 3/2018 | Brashers | H04L 9/3236 |
| 2018/0144153 A1* | 5/2018 | Pead | G06F 21/6245 |
| 2018/0211252 A1* | 7/2018 | Lintner | G06Q 20/3825 |
| 2019/0147188 A1* | 5/2019 | Benaloh | H04L 63/0442 |
| | | | 726/26 |
| 2019/0199689 A1* | 6/2019 | McKellar | H04L 9/3297 |
| 2019/0238525 A1* | 8/2019 | Padmanabhan | G06F 21/6245 |

* cited by examiner

BLOCKCHAIN BASED INFORMATION MANAGEMENT

TECHNICAL FIELD

The present invention generally relates to managing sensitive information. In particular, the present invention relates to using blockchain technology for managing, controlling and sharing sensitive information associated with a person or entity.

BACKGROUND

Personal information is either personally identifiable information, or sensitive personal information that can be used on its own or with other information to identify, contact, or locate a single person, or to identify an individual in context. Examples of personal information include, but are not limited to social security information, age, gender, address, education, family tree, medical history, psychiatric evaluations, psychologist evaluations, allergies, financial accounts, credit scores, etc. Personal information may be used to authenticate people/entities and complete transactions, such as purchasing cars and houses or gaining access to certain resources. However, personal information may be stored by many different systems for both good and malicious purposes, with little or no control of the information by the owners of the information or insight into how their information is being used.

BRIEF SUMMARY OF THE INVENTION

Techniques are disclosed herein for employing blockchain technology for managing, controlling and sharing sensitive information. According to certain embodiments, a pooling system and an accountability system are disclosed. The pooling system and the accountability system mediate information exchange between the owner of the information and requester of the information, while maintaining a record of the accesses in the blockchain fabric. The pooling system provides an interface for a user for aggregating information or references to information together with a set of conditions for access to such information. The pooling system also maintains multiple checks and references of information associated with a transaction and can also alter access based on predictive analysis of multiple users. The accountability system is the interface to the blockchain fabric that generates the transactions and maintains statistics for the access requests from various requesters. By controlling the generation of the transactions, the accountability system allows for restricted access to the information by the requesters based upon a number of conditions or criteria. Furthermore, a user interface is provided for allowing the user the ability to define the information to be included in the transaction and the conditions or bounds for allowing access to the information. The user interface may also provide access to statistics and additional control for accessing the information associated with the user.

An example method for managing, sharing and controlling information may include receiving information associated with a user and a first set of conditions, wherein satisfying the first set of conditions by a requester of the information determines access to the information by the requester and the first set of conditions include a first count for a number of queries allowed for accessing the information, generating a first transaction using the information and the first set of conditions, transmitting the first transaction to be stored in a blockchain ledger, receiving an indication that the first transaction has been accessed by a requester, in response to receiving the indication, decrementing or adjusting the first count to generate a second count and generating a second set of conditions that includes the second count, generating a second transaction using the information and the second set of conditions, and transmitting the second transaction to be stored in the blockchain ledger.

In certain embodiments, generating the first transaction using the information and the first set of conditions, may include converting the first set of conditions to first set of instructions according to a blockchain programming model, encrypting the information associated with the user to generate encrypted information, and generating the first transaction using the encrypted information and the first set of instructions. In certain embodiments, once the count is depleted, that is the second count is zero or a pre-determined number, the requesters can no longer access information stored in the transaction. In certain embodiments, the amount of the first count that is decremented or adjusted by a number that is determined based on one or more of trustworthiness of the user, trustworthiness of the requester, location of request, or time of the request. In certain embodiments, including a transaction termination indicator inside the second transaction restricts access to the information in the first transaction.

In certain embodiments, the information may include one or more of age, date of birth, location of birth, gender, address, education, family tree, medical history, psychiatric evaluations, psychologist evaluations, allergies, health records, personal identifiers, social security information, license numbers, other government issued personal identifying numbers, financial accounts, credit scores, digital certificate for insurance proof, or digital proof for credit score. In certain embodiments, the first set of conditions include one or more of expiration time, maximum number of requests of the information allowed, a transaction termination condition, geographical conditions or temporal conditions.

In certain embodiments of the example method, the information includes a reference to user information stored in a data store. In certain implementations, the information is encrypted using portions of the first set of conditions.

In certain embodiments, the above disclosure with respect to the method may be performed by a computer system or apparatus and/or by a processor using instructions and data stored on a non-transient computer-readable memory and a network interface for sending and receiving transactions. In addition, certain portions, features or limitations of the above disclosure with respect to the method may be performed as a means for performing such portions, features or limitations or may be stored as executable code on a non-transitory computer-readable medium.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION OF THE INVENTION

Figure 1:
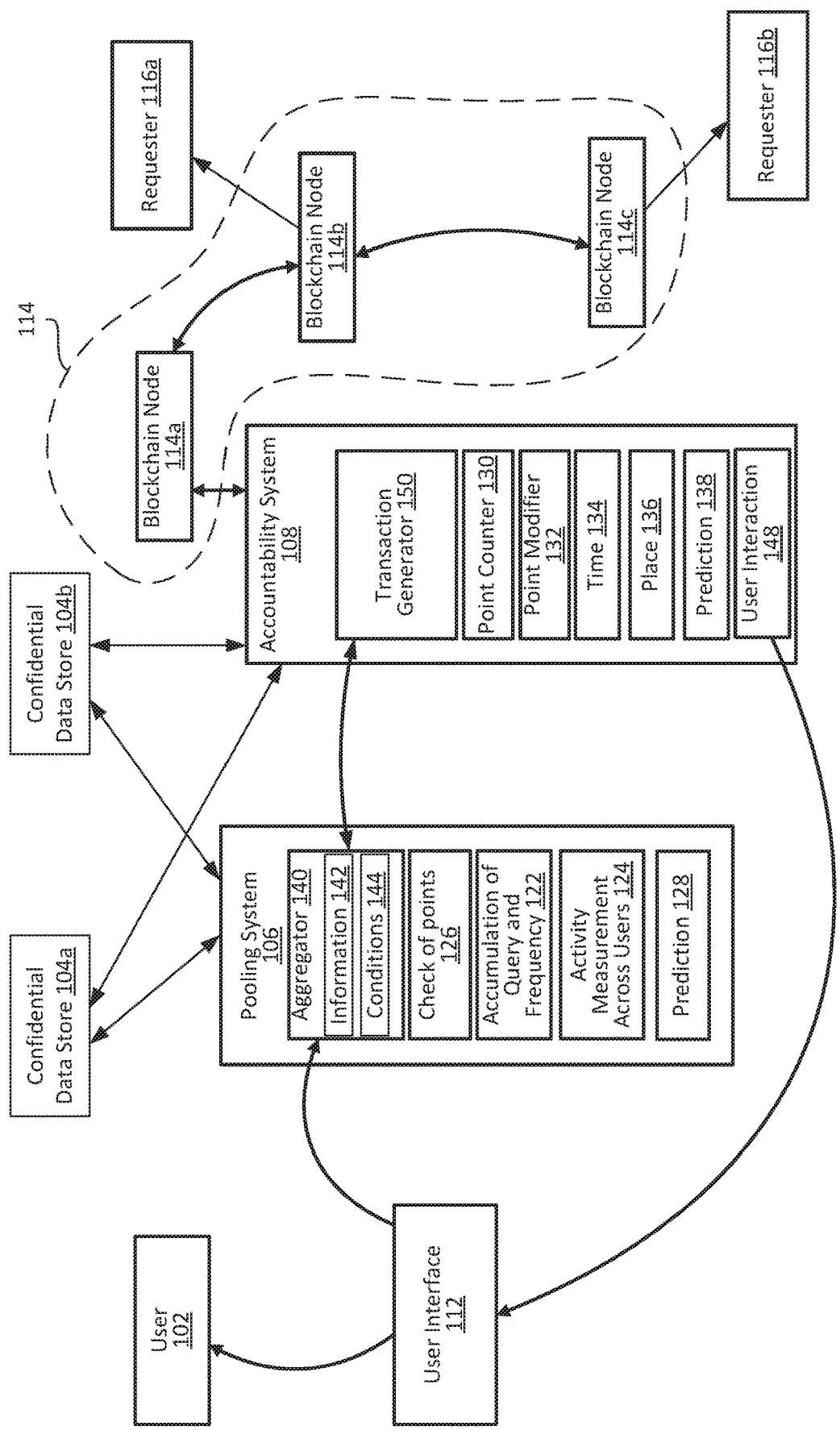
FIG. 1 illustrates an example information management system using a blockchain fabric, according to certain embodiments of the disclosure.

The present invention generally relates to managing sensitive information. In particular, the present invention relates to using blockchain technology for managing, controlling and sharing sensitive information associated with a person or entity.

Traditionally, interactions between parties are mediated using financial measures and information to complete a transaction is exchanged using various different and disconnected documents, systems and entities. The process of exchanging and verifying information is time consuming, costly and significantly increases the transaction cost.

Techniques are disclosed for mediating sensitive information between various parties. According to certain embodiments, a pooling system and an accountability system are disclosed. The pooling system and the accountability system mediate information exchange between the owner of the information and requester of the information, while maintaining a record of the accesses in the blockchain fabric. The pooling system provides an interface for a user for aggregating information or references to information together with conditions for access to such information. The pooling system also maintains multiple checks and references of information associated with a transaction and can also alter access based on predictive analysis of multiple users. The accountability system is the interface to the blockchain fabric that generates the transactions and maintains statistics for the access requests from various requesters. By controlling the generation of the transactions, the accountability system allows for restricted access to the information by the requesters based upon a number of conditions or criteria. Furthermore, a user interface is provided for allowing the user the ability to define the information to be included in the transaction and the conditions or bounds for allowing access to the information. The user interface may also provide access to statistics and additional control for accessing the information associated with the user.

An example and non-limiting use case for such a system may include purchase of a car or any other transaction that includes conveyance of personal information for completing a transaction. The user can request pooling together of personal information, such as name, address, age, financial information, insurance information, loan pre-approval, etc. using the described system. Besides, including information, the user can also include or request inclusion of certificates that prove/verify certain pieces of information. For example, for name, address and age for a user, a certificate issued by a governmental agency (e.g., Department of Motor Vehicles) may provide validation of the information. The user can also define certain criteria for accessing the information. For example, since the information is pooled together for purchasing a car, only certified car dealers may be able to access the information. Furthermore, the user can define other bounds for the transaction, such as the number of car dealers that can access the information, time or period of access (e.g., 8:00 AM CST to 5:00 PM CST, location (e.g., Texas), expiration date, etc. If the user defines the number of accesses as five, once five car dealers request and access the information, no additional dealers can access the user's information unless reauthorized by the user. Also, if the user purchases the car the user can define the purchase itself as an event that terminates the contract for sharing information. Thus, the system provides the user with granular control over the use of their personal information.

The provided system can be implemented using "smart contracts" in blockchain technology. A smart contract is a blockchain protocol intended to digitally facilitate, verify, or enforce the negotiation or performance of a contract. Smart contracts allow the performance of credible transactions without third parties. These transactions are trackable and irreversible. These contracts are partially or fully self-executing, self-enforcing, or both. The pooled information by the user is included in a blockchain transaction, the release of which may be governed by the fulfilment of certain conditions defined by the user and included as part of the smart contract implemented in the transaction. The information itself may be encrypted before encapsulated in the transaction, such that only fulfillment of the conditions and access to the proper key may decrypt the information and release it to the requester from the transaction. The conditions may be converted to instructions by the accountability system and included in the transaction. In an example blockchain platform, such as Ethereum, the transaction may be generated using a programing language such as Solidity, and executed in an Ethereum Virtual Machine (EVM) on a blockchain node of the blockchain infrastructure.

In certain embodiments, such a system may allow for distributed and verified trust of information sharing without a central authority. Furthermore, such a system may save user time by allowing the user to pool sensitive information for a transaction and control release of that information only under specific conditions. Furthermore, the user interface to the system would allow the user to stay informed about the health of their privacy and security state.

FIG. 1 illustrates an example system for managing user information. In certain embodiments, a pooling system 106 and an accounting system 108 are used along with blockchain fabric 114 for managing user information. As shown in FIG. 1, the blockchain fabric 114 includes blockchain nodes 114a, 114b and 114c. The pooling system 106, the accounting system 108 and the blockchain nodes of the blockchain fabric 114 may be implemented as servers or computing devices, similar to the computer system disclosed in FIG. 6. In certain embodiments, several devices connect to the blockchain fabric 114 by connecting to one of the various nodes (114a, 114b or 114c) of the blockchain fabric 114. Ethereum is an example blockchain technology that may be used to implement the blockchain fabric 114 and associated nodes—114a, 114b and 114c.

In certain embodiments, the pooling system 106 is responsible for aggregating information to be included in a transaction that is stored in the blockchain fabric 114. In certain embodiments, instead of information, pointers to information may be stored in the transaction. Once the information 142 associated with a user is aggregated, the information 142 is sent over to the accountability system 108 for further processing and storing in the blockchain fabric 114.

The aggregator 140 of the pooling system 106 may receive information 142 from a user 102 via the user interface 112 and accordingly aggregate information 142 that is to be included in the transaction and released to the requester upon satisfying certain conditions 144. Information 142 may include confidential and sensitive information that would include age, date of birth, location of birth, gender, address, education, family tree, medical history, psychiatric evaluations, psychologist evaluations, allergies, health records, personal identifiers (e.g., social security information, license numbers), financial accounts, credit scores, etc. Information 142 may also include certificates that provide proof of certain attributes associated with the user 102. For example, information 142 may include digital certificates for pre-approval of loan from a bank, credit score (e.g., Fair Isaac Corporation (FICO) score) from the credit bureau (e.g., Experian, Equifax, Transunion, etc.), validation of insurance from insurance issuer, validation of address, age, physical attributes, etc. from a governmental agency, etc. The information 142 to be included by the aggregator 140 may be specified by the user 102. However, the information 142 itself may be provided by the user 102 or in some cases retrieved from a confidential data store (104a or 104b) such as the Department of Motor Vehicles (DMV), credit bureau, school records, etc.

The aggregator 140 may also receive information from the user 102 regarding the bounds of the transaction via user interface 112. The bounds of the transaction may refer to certain set of conditions 144 that once fulfilled, either result in revealing of the information to the requester or may result in some other action, such as termination of the transaction. Conditions 144 may include expiration time, maximum number of queries allowed, a transaction termination condition, geographical and temporal bounds, etc. As will be described in more detail later, these conditions 144 may be incorporated into a transaction as a "smart contract" by the accountability system 108. Once certain conditions of the "smart contract" are fulfilled, the blockchain node/fabric may perform certain actions, such as release information included in the transaction.

In addition to aggregating transaction information 142 and conditions 144 to be included in the transaction, the pooling system 106 may also perform certain accounting functions associated with the user 102. For example, the pooling system 106 may perform accumulation of query and frequency 122 of requests for certain information for a user, activity measurement across a group of users 124, and store a check of points 126 for a particular transaction. Furthermore, the pooling system 106 may include a prediction 128 engine for performing various predictions with respect to the user 102 or particular requests associated with a user 102. The check of points 126 may be provided by the user 102 via the user interface 112 and may indicate the number of times the user 102 authorizes the transaction information to be accessed by the requester 116a.

In certain embodiments, the prediction 128 engine may use statistics aggregated by the pooling system 106 by accumulation of query and frequency 122 and the activity measurement across users 124 to determine suspicious activity by a nefarious requester and/or the trustworthiness of the user. For example, the accumulation of query and frequency 122 may indicate the number of queries from a particular requester for a particular user. The prediction 128 engine may determine that the number of queries from a particular requester is abnormally high within a short period of time for the user, with respect to previous queries based on statistics from the accumulation of query and frequency 122 for the requests and may recommend remedial action to the accounting system 108. On the other hand, the activity and measurement across users 124 may accumulate statistics regarding the number of queries from a particular requester across all or most of the users. Similarly, the prediction 128 engine may determine that the number of queries from a particular requester for the user is relatively high, based on the relative difference of the requests for the user 102 with respect to the activity measurement across users 124 and may recommend remedial action to the accounting system 108.

For example, for a user who is an infrequent visitor to bars, if their respective age is repeatedly checked within a short window of time from a bar, this information may be accumulated by the accumulation of query and frequency 122 module and may result in the prediction 128 engine recommending remedial action to the accountability system 108. Remedial action may include, the accountability system 108 using the point modifier 132 to reduce the number of points available for either an abnormal and potentially malicious requester or an untrustworthy user, such that access to the transaction information is reasonably restricted.

In another example, the pooling system 106 may measure a number of requests for a transaction comprising loan information for a user. If the prediction 128 engine based on the activity measurement across users 124 determines that the number of requests from the different requesters have exceeded the norm, the prediction 128 engine may again direct the accountability system 108 to modify the points using the point modifier 132 such that additional requesters are either blocked or may need additional permissions to access the information regarding the user.

The accountability system 108 interacts with the pooling system 106 and receives information 142 and conditions 144 from the pooling system 106 for generating a transaction using the transaction generator 150. The transaction generator 150 generates a transaction or "smart transaction" by including the transaction information 142 in the transaction. The information 142 may be encrypted by the transaction generator 150 prior to including the information in the transaction. In addition, the transaction generator 150 may autonomously generate executable code using the conditions 144. This executable code is executable by the blockchain node 114a and is included in the transaction. This executable code included in the transaction represents certain condition that once fulfilled by the requester 116a releases the information 142 to the requester 116a. Releasing the information 142 to the requester 116a may include decrypting a portion or all of the information 142 by the blockchain node 114a. The transaction generator 150 may also digitally sign the transaction using its private key and store the digital signature as part of the transaction prior to sending the transaction to the blockchain fabric 114 for storing.

In certain embodiments, the information in the transaction may be decrypted in a graduated manner. For example, the information may be stored in different blocks based on the sensitivity of the information. Different portions of the information may be decrypted using different keys. For example, if a vendor is requesting just the name and age of the user 102, the information may be provided with a key that can only decode the respective information from the transaction, whereas, a vendor requesting a license number or social security number may need a separate key and may also need to satisfy additional checks before receiving the requested information.

Figure 3:
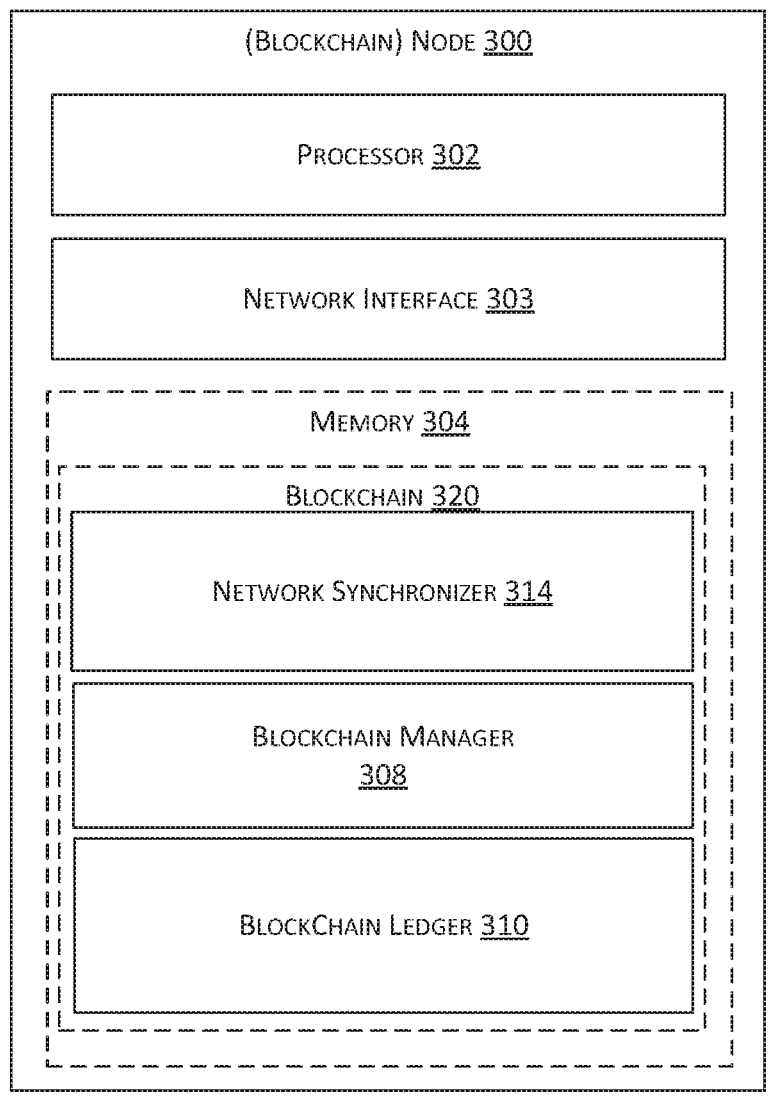
FIG. 3 illustrates an example blockchain node, according certain aspects of the disclosure.
Figure 6:
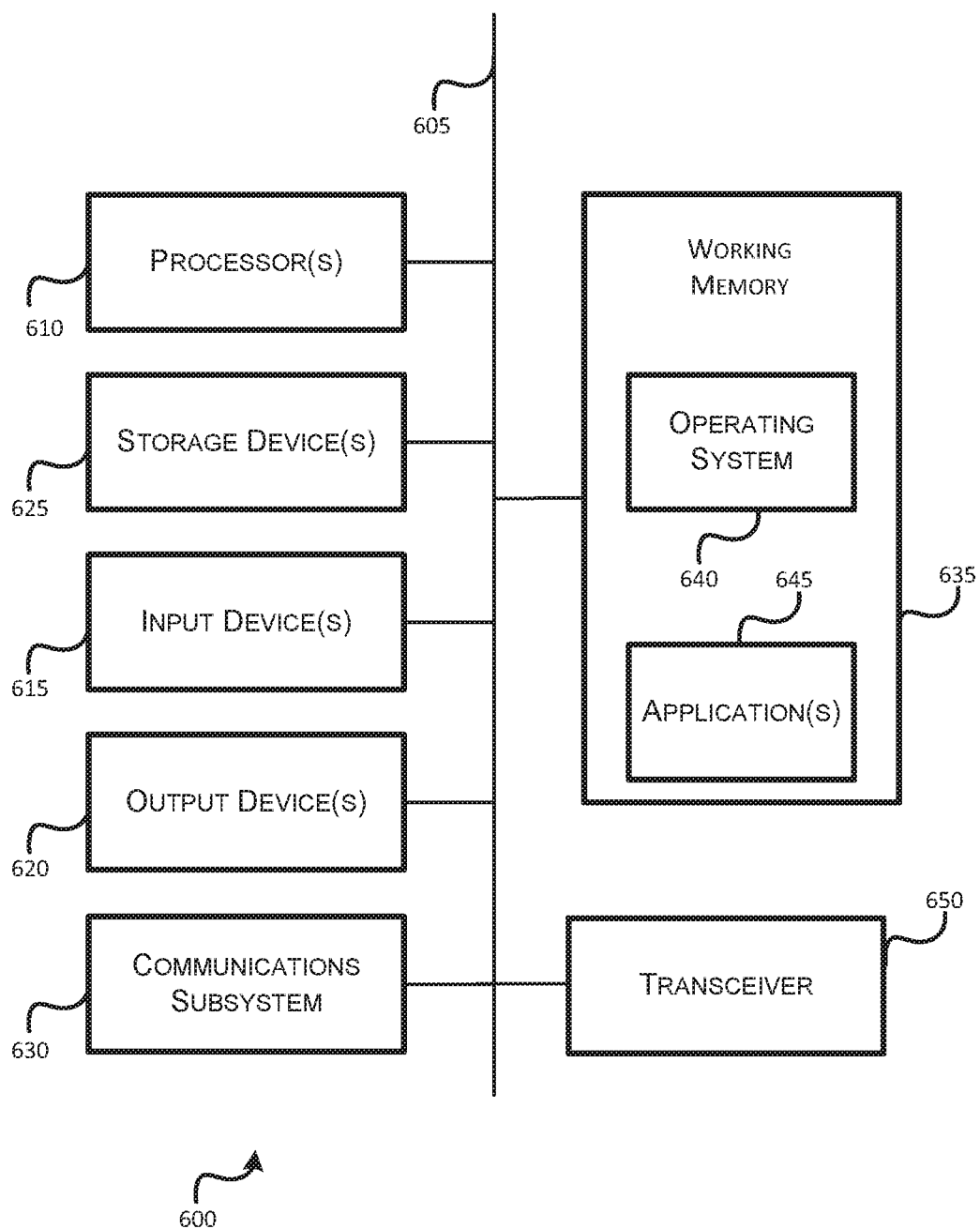
FIG. 6 is an example computer system, according to certain embodiments of the disclosure.

The transaction generator 150 interacts with the blockchain fabric 114 via a blockchain node 114a. FIG. 1 discloses a blockchain fabric 114 comprising a net of (computing) blockchain nodes 114a-c. FIG. 3 and FIG. 6 disclose example implementations of a blockchain node of the blockchain fabric 114. Each blockchain node may execute instructions from their respective memory and/or local storage to maintain the blockchain ledger in memory or local storage, interact with other nodes over the network, grant access to the transaction generator 150 of the accountability system 108 for writing transactions and grant access to the information inside the transactions to the requesters.

In one embodiment, blockchain uses a blockchain ledger that refers to a continuously growing list of records, called blocks, which are linked and secured using cryptography. Each block of the blockchain ledger typically contains a cryptographic hash of the previous block, a timestamp and several transactions. By design, a blockchain ledger is inherently resistant to modification of data that is stored in the blocks. In certain embodiments, for use as a distributed ledger to store sensitive information, the blockchain ledger is managed by a peer-to-peer network (referred to as the blockchain fabric 114), comprising blockchain nodes 114a-c, collectively adhering to a protocol for inter-node communication and validating new blocks of transactions. Once recorded, the data in any given block cannot be altered retroactively without the alteration of all subsequent blocks, which requires collusion of the network majority.

Every blockchain node in the blockchain fabric 114 has synchronized access to the entire blockchain ledger maintained by blockchain fabric 100 with the guarantee that any other node in the blockchain fabric has exactly the same copy or access to the same copy of the entire blockchain ledger. Furthermore, any node in the blockchain fabric 100 can verify the authenticity and integrity of the blockchain ledger by performing cryptographic operations on the hashes embedded in the blocks of the blockchain ledger. Therefore, the blockchain fabric 114 provides distributed access to the requesters to the user information stored as part of the blockchain ledger in a secure, distributed and immutable manner. Furthermore, different requesters can have access to one or more nodes of the blockchain fabric 114 that provides access to user information from the local copy of the blockchain ledger in the blockchain fabric 114, knowing that an update to any of the local copies of the blockchain ledger stored at any of the respective blockchain nodes will get validated and propagated throughout the blockchain fabric 114.

In FIG. 1, the requesters may be connected to any blockchain node of the blockchain fabric 114 and access the same information from their respective blockchain ledger. For example, the accountability system 108 is coupled to blockchain node 114a for storing the transactions, whereas requester 116a is coupled to blockchain node 114b and requester 116b is coupled to blockchain node 114c. In this system, the requester 116a and requester 116b will have access to the transactions stored by the accountability system 108 to the blockchain fabric 114 via the blockchain node 114a.

In certain embodiments, an example blockchain technology optimized for executing "smart contracts," such as Ethereum may be used. Ethereum is an open-source, public, blockchain-based distributed computing platform and operating system featuring smart contract functionality. Ethereum transactions can be programmed using a blockchain programing model or paradigm named "Solidity." Ethereum provides a decentralized Turing-complete virtual machine, the Ethereum Virtual Machine (EVM), which can execute the smart contracts.

In addition to the transaction generator 150, the accountability system 108 may perform accounting services for the requests received from the various requesters. For example, after each successful access of the transaction, the blockchain node 114a may transmit information about the requester 116a that accessed the transaction to the accountability system 108. The point counter 130 of the accountability system 108 may decrement or adjust the count or number of points from the transaction and regenerate another transaction associated with the information 142 and conditions 144 using the transaction generator 150. This new transaction may also include the new count of points for the transaction sent back to the blockchain node 114a to be stored in the blockchain ledger of the blockchain fabric 114.

In certain embodiments, the prediction 138 engine of the accountability system 108 may modify the manner in which the points for the new transaction are changed. For example, based on the time 134 the request is made and place 136 of the requester 116a the points may be decremented or adjusted at a faster pace than merely being decremented or adjusted by one. Furthermore, the prediction 138 engine may take into account the reputation of the requesters making the request. For example, if a requester is known to be untrustworthy, a higher number of points may be decremented or adjusted from the transaction, such that the points run out and the access to the transaction information included in the transaction can be restricted. On the other hand, in certain embodiments, the accountability system 108 may be incentivized by the requester 116a to allow release of the information to the requester 116a by paying for the information 142. For example, the requester 116a may request additional points to be added to the transaction, such that the requester 116a can access the information 142 from the transaction. In certain embodiments, the terms of the payment and release of the information 142 may be setup between the user 102 and the accountability system 108, such that the user 102 controls who and how much may be paid by a requester 116a to access the information and may also receive a certain portion of the payment or other vendor incentives for sharing their sensitive information 142.

In certain embodiments, the user interface 112 may interact with the accountability system 108 via the user interaction 148 module to provide the user 102 with live observability of the activity associated with their information 142. The user 102 may be able to view the different types of requests, the identity of the requesters, the frequency of the requesters, etc. In certain embodiments, the user 102 may be able to further restrict access by dynamically interacting with the accountability system 108 through the user interface 112 to limit access to their information 142. For example, the user 102, upon review of the accesses to their information 142 may determinate that they would like to reduce the number of allowed points/accesses to their information 142. In such scenarios, the user interface 112 may provide the means of communicating such information to the accountability system 108 via the user interaction 148 module. The accountability system 108 may retrieve the transaction comprising the information 142 for the user 102, reduce or eliminate the number points for the transaction using the point modifier 132 and store the modified transaction back on the blockchain fabric 114. In yet another embodiment, the user may request additional points to be added to their transactions so that the user may continue to provide access to their information 142 to the requesters.

As previously discussed, a person completing a financial transaction, such as a car purchase is illustrative of the use of such a system. It should be noted, that the foregoing is simply an example to facilitate the understanding of the aspects of the invention and is not meant to limit the scope of the invention. A purchase of a car usually requires conveyance of personal information. In such circumstances, the purchaser can perform a pre-approval of information to be pooled together, such as financial information, validation for a loan for cost amount, validation of offering for insurance, and validation of residency. Furthermore, the purchaser can provide the conditions for the transactions, such as an expiration date, maximum number of queries against the pool, a termination code, location of where to allow execution, etc. to the pooling system 106. In return, the pooling system 106 interacts with the accountability system 108, generates a transaction by encrypting the pooled information and using the set of conditions. The accountability system 108 may return a key that may be used for decrypting the transaction to the purchaser either via the pooling system 106 or directly through the user interface 112. In certain embodiments, the key may be associated with many traditional and non-traditional keys, e.g. Radio Frequency Identifier (RFID) on backpack, luggage, car, location on cell phone, personal biometrics (face, voice, etc.).

The purchaser may visit several vendors and provide the key so that the vendor can access the pooled information and each "hit" on the pooled information results in a decrementing or adjusting of the amount of "points" available to access the information. Optionally, points may be added by additional vendors offering to supplant information previously stored in the pool. Furthermore, in some embodiments, riskier vendors may cost more "points" for a transaction. In certain embodiments, the purchaser may want to provide much greater access to the information, that may require significantly more points. In such instances, the purchaser may add more points using the user interface 112. And once the transaction is completed, the purchaser may instruct the system to terminate the transactions in a manner that no additional requesters may access the information. In some instances, the transaction between the vendor and the purchaser itself may also be logged in the blockchain ledger, providing a permanent record of the transaction.

Figure 2:
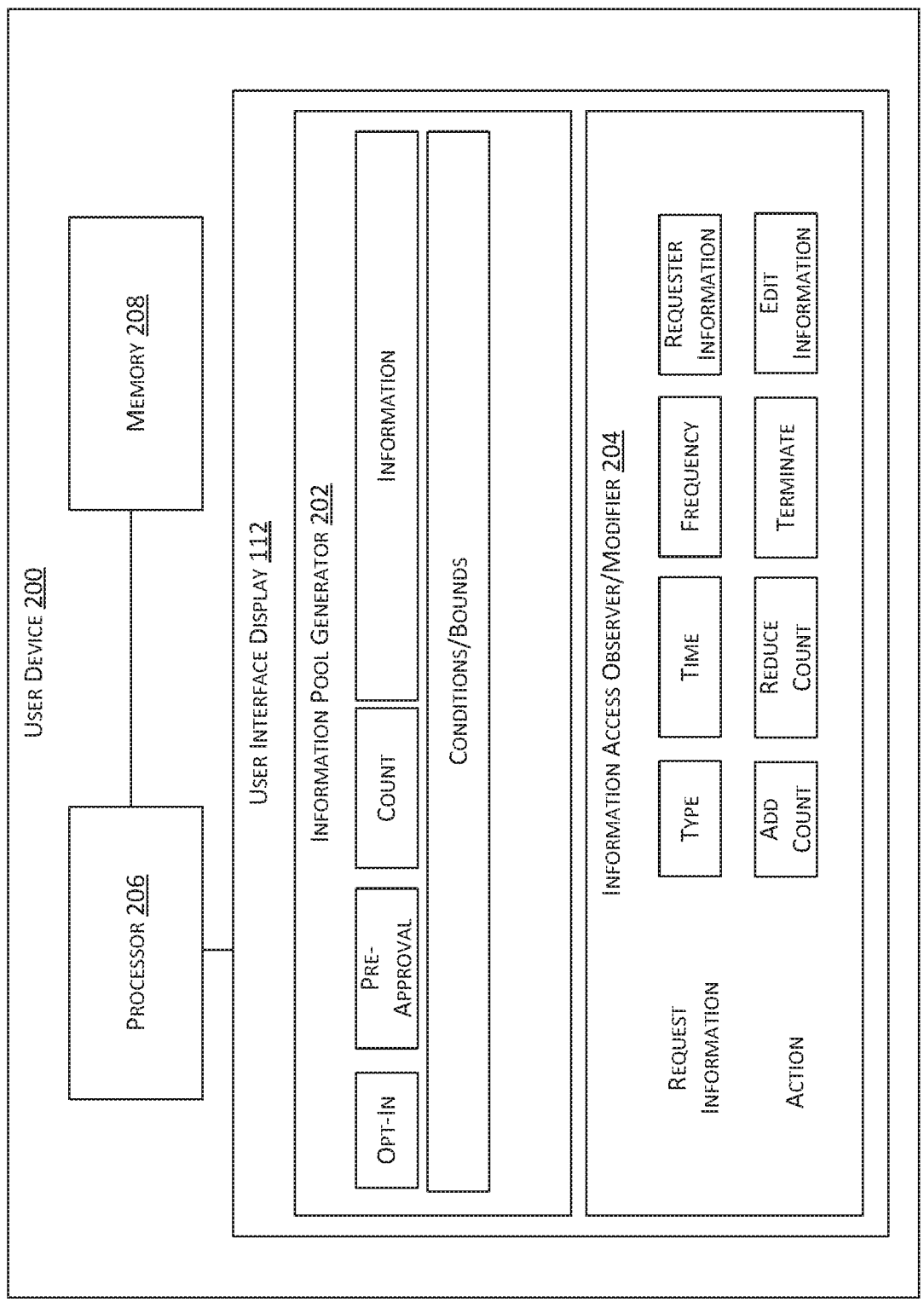
FIG. 2 illustrates an example user device, according certain aspects of the disclosure.

FIG. 2 provides an example, but non-limiting view of the user interface 112. An example user interface 112 may be displayed on a screen of a user device 200, by executing instructions on a processor 206 from memory 208. Furthermore, the user device may be implemented using one or more components disclosed in more detail in FIG. 6. The user interface 112 executing on user device 200 is shown as having an information pool generator 202 and an information access observer/modifier 204 module. The information pool generator 202 primarily interfaces with the pooling system 106 and provides the user 102 with an interface for pooling sensitive information together, such as information 142 and providing conditions 144 for release of that information, such that the user 102 provides controls on what information is disclosed, to whom the information is disclosed and for how many times the information is disclosed.

In certain embodiments, the information pool generator 202 may also allow the user 102 to specify certain programs that the user 102 can opt-in to or provide pre-approval for. For example, a user 102 may opt-in to certain programs that allow looser access to information by certain entities or certain information associated with the user. For example, a user 102 may opt-in to providing access to their respective information to certain governmental associations in times of emergency. For example, the user may opt-in to providing certain medical facts (e.g., age, blood type) and medical history (e.g., allergies, diseases, etc.) to certified medical professionals. However, even in these situations, the user 102 may restrict the number of times that such personnel can access their records. Other opt-in services may include providing proof of age to certain trusted agencies or using transactions to perform passport functions, where an authorized party can access the passport and its information. And as the user travels through different airports, the authorized agencies can stamp the passport, where each stamp may result in decrementing or adjusting of points from the passport (similar to passport pages).

On the other hand, the user 102 may provide pre-approval for access to a portion of their information by certain vendors. For example, a user 102 wanting to be solicited by credit card companies may opt-in to a service that allows release of user name, address (physical or electronic) and trustworthiness of the user 102, such that the credit card companies that are most interested in serving such a user 102 may provide offers to the user at the address provided.

The information access observer/modifier 204 may mostly interface with the accountability system 108 for retrieving real-time information regarding the requests being made to the information for the user 102. In certain embodiments, the user interface 112 may provide the type of requests, the times that that the requests were made, the frequency of the requests and information about the requester. Continuing with the car purchase example, the user interface 112, may inform the user regarding the number of car vendors that have accessed their records, the time of the accesses and information about each of the car vendors, such as their location and trustworthiness.

Furthermore, the information access observer/modifier 204 may allow the user 102 to take particular actions with respect to the usage of their information. For example, if the user 102 was almost out of points, but needed to visit more car vendors and continue to provide their information to new car vendors, the user 102 can add more points, so that the system could continue to allow access to the users' information to the new vendors. Also, if the user 102 observes suspicious activity the user 102 may reduce the number of points available for accessing the information or completely terminate the transaction. In certain instances, the user 102 may also edit information in real time, either to correct mistakes or augment the information previously provided via the pooling system 106.

FIG. 3 illustrates an example (computing) blockchain node 300 of a blockchain fabric 114, according to certain aspects of the disclosure. In certain embodiments, in addition to the components disclosed in FIG. 3, one or more components and/or functionality disclosed with respect to FIG. 6 may also be included in the blockchain node 300 of FIG. 3. For example, FIG. 6 discloses a transceiver 650 that may be used in a blockchain node. In certain embodiments, the blockchain node 300 may also include a transceiver 650 and may wirelessly (or using a wired connection) transmit and receive information instead or in addition to a network interface 303 disclosed in FIG. 3. The components and modules discussed in FIG. 3 may be implemented in hardware, software, firmware or any combination thereof.

Blockchain node 300 may include a processor 302 coupled to memory 304. In certain embodiments, the processor 302 may be similar to the processor 610 of FIG. 6. In certain embodiments, the memory 304 may be a non-transient computer-readable medium and/or may be similar to memory 635 of FIG. 6. The processor 602 may load instructions and data from a storage device (not shown) into memory 304 before executing the instructions from the memory 304. For implementing certain aspects of the disclosure, several different modules comprising instructions and data may be loaded into memory. Examples of such modules may include the blockchain ledger 310, blockchain manager 308, and network synchronizer 314.

Figure 4:
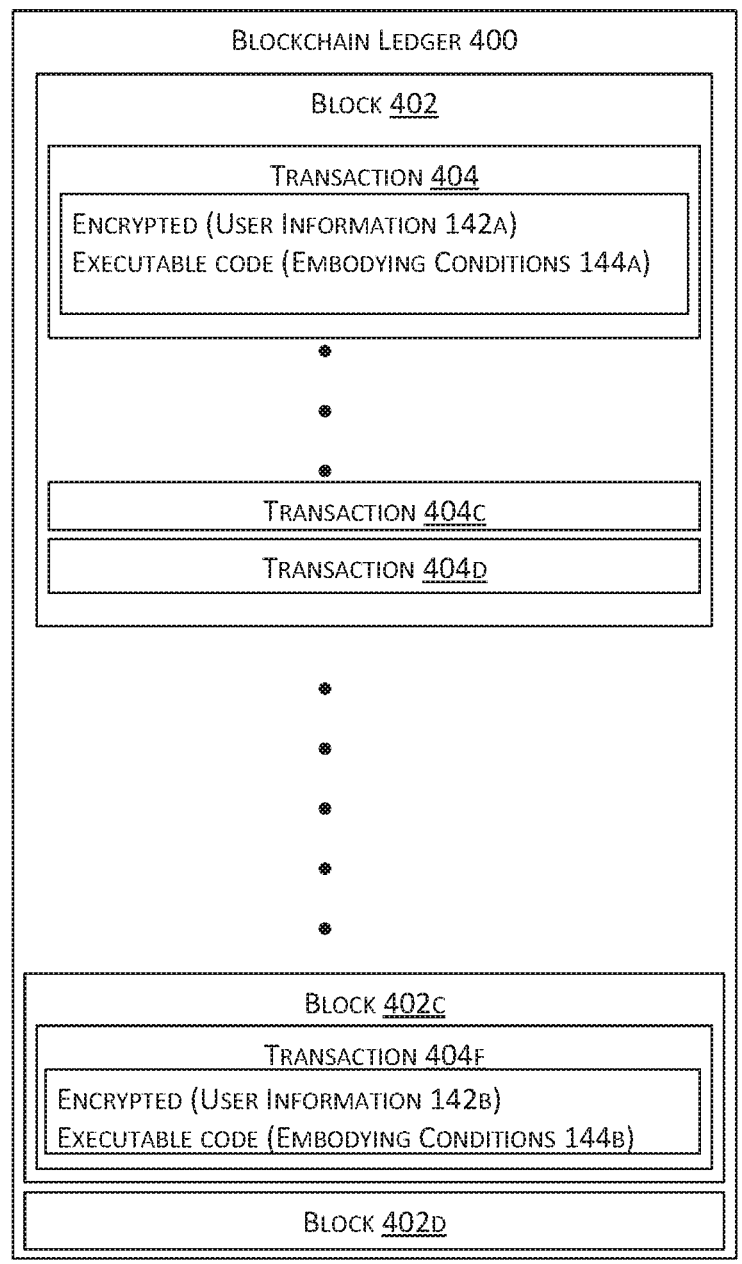
FIG. 4 is an example block diagram that illustrates some aspects of a blockchain ledger, according to certain example embodiments.

The blockchain ledger 310 may also be referred to simply as blockchain or a blockchain data structure. FIG. 4 is an example block diagram that illustrates some aspects of an example blockchain ledger 310, according to certain aspects of the disclosure. Momentarily referring to FIG. 4, the blockchain ledger 400 is a data structure that stores the information for different users as transactions and includes a continuously growing list of records, called blocks, which are linked and secured using cryptography. In FIG. 4, the blockchain ledger 400 includes the plurality of blocks—402, 402c, and 402d. Each block includes the plurality of transactions—transactions 404, 404c, 404d in block 402 and transaction 404f in block 402c.

Although, not shown in FIG. 4, each block of the blockchain ledger 400 typically contains a cryptographic hash of the previous block, a timestamp and several transactions. A transaction is a signed data structure expressing a transfer of information. In certain embodiments described herein, transactions are generated by various managing entities, transmitted over the network and included into blocks, made permanent by the blockchain ledger 400.

By design, the blockchain ledger 400 is inherently resistant to modification of data that is stored in the blocks. Therefore, the order and content of the blocks (that includes transactions in each block) are weaved together and as new transactions arrive and consequently new blocks are added using cryptographic hashes (e.g., one way functions), the content of the blockchain ledger 400 becomes immutable. Changing data associated with old transactions is not feasible, since such a change would require regeneration of hashes for every subsequent transaction/block including the block in which the change is desired.

FIG. 4 also illustrates multiple transactions that include the encrypted information (142A, 142B) and instructions embodying conditions (144A, 144B). The instructions may be generated from the set of conditions provided by the user 102 that once are satisfied result in decrypting and releasing of the information. Although, not shown, the transactions may have several other elements, such as identifiers, digital signatures and other states associated with performance of the instructions. In certain embodiments, the latest transaction associated with a user and assigned a specific identifier may be the only valid transaction. The previous transactions may still be available and may provide a permanent log of all the transactions associated with the user for that specific identifier.

The blockchain manager 308 manages the blockchain ledger 310. In certain embodiments, the blockchain manager 308 may be referred to as the blockchain core. The blockchain manager 308 is responsible for storing and retrieving transactions from the blockchain ledger 310. In addition, the blockchain manager 308 is responsible for generating hashes while storing of transactions and blocks in the blockchain ledger 310 and also verification of new blocks received via the network interface 303 using cryptographic operations prior to adding such blocks/transactions to the blockchain ledger 310. The blockchain manager 308 also performs peer discovery and manages synchronization with other nodes in the blockchain fabric 114 using network synchronizer 314 via the network interface 303 of the blockchain node 300.

Figure 5:
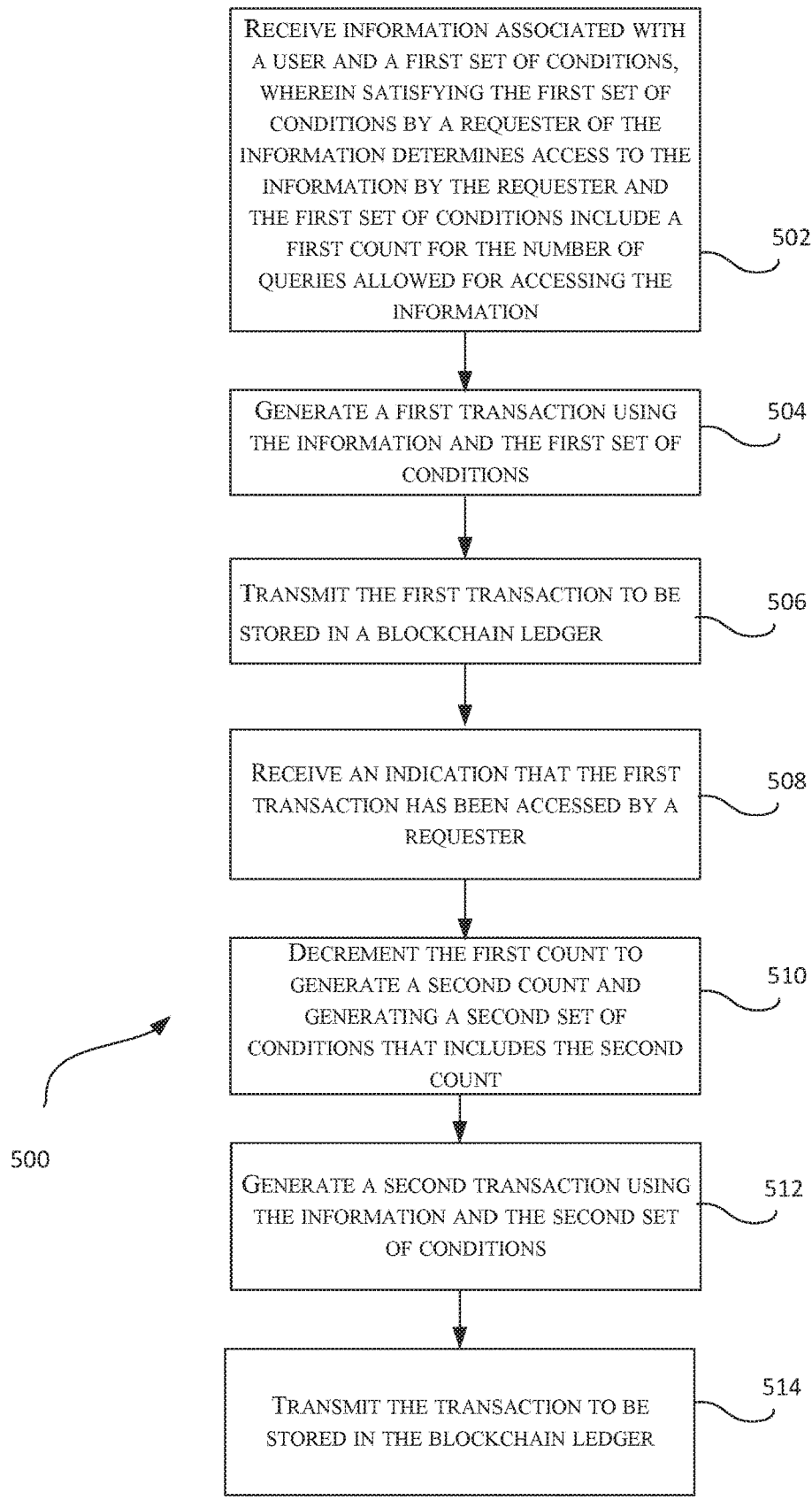
FIG. 5 is a simplified flow diagram, illustrating a process for generating a transaction and interacting with the blockchain fabric according to certain embodiments of the disclosure.

FIG. 5 is a simplified flow diagram, illustrating a process for generating a transaction and interacting with the blockchain fabric according to certain embodiments of the disclosure. Blockchain fabric 114 of FIG. 1 is an example of such a blockchain fabric. In certain embodiments, the accountability system 108 of FIG. 1 performs several steps of the described process 500. The process 500 is performed by processing logic that comprises hardware (circuitry, dedicated logic, etc.), software (such as is run on a general purpose computer system or a dedicated machine), firmware (embedded software), or any combination thereof. In one embodiment, the process 500 is performed by one or more computer systems 600 as described in FIG. 6. In certain embodiments, the computer system may also be referred to as a server or computing server.

At step 502, components of the system, such as the accountability system 108, may receive information associated with a user and a first set of conditions. In certain embodiments, the accountability system 108 may receive the information and the first set of conditions from a user via the pooling system 106. In certain embodiments, satisfying the first set of conditions by a requester of the information determines access to the information by the requester. The first set of conditions may include a first count for the number of queries allowed for accessing the information.

In certain embodiments, the information may include one or more of age, date of birth, location of birth, gender, address, education, family tree, medical history, psychiatric evaluations, psychologist evaluations, allergies, health records, personal identifiers (e.g., social security information, license numbers), financial accounts, and credit scores. In certain embodiments, information may also include certificates that provide validation or proof of certain attributes associated with the user. For example, information 142 may include digital certificates for pre-approval of loan from a bank, credit score (e.g., FICO score) from the credit bureau (e.g., Experian, Equifax, Transunion, etc.), validation of insurance from insurance issuer, validation of address, age, physical attributes, etc. from a governmental agency, etc. In yet other embodiments, information may include pointers to the actual information stored in other trusted data bases. In certain embodiments, the first set of conditions include one or more of expiration time, maximum number of queries allowed, a transaction termination condition, geographical and temporal bounds, etc.

At step 504, components of the system, such as the accountability system 108, generate a first transaction using the information and the first set of conditions. In certain embodiments, generating the first transaction using the information and the first set of conditions, further comprises, converting the first set of conditions to first set of instructions according to a blockchain programming model. For example, for Ethereum blockchain technology, Solidity may be used for generating instructions that are to be included in the transaction. Embodiments may also include encrypting the information associated with the user to generate encrypted information. In certain embodiments, the information may be encrypted using portions of the conditions. Therefore, when the requester satisfies the set of conditions, the decryption key may be automatically generated from portions of the set of conditions, eliminating the need of a password or key. Components of the system, may generate the first transaction using the encrypted information and the first set of instructions.

At step 506, components of the system, such as the accountability system 108, transmit the first transaction to be stored in a blockchain node. The first transaction may be transmitted using a network interface for the accountability system 108.

At step 508, components of the system, such as the accountability system 108, receive an indication that the first transaction has been accessed by a requester. For example, in certain embodiments, each of the transactions themselves may be encoded to send back an indication or the released information back to the accountability system 108 once the requester accesses the information, so that the accountability system 108 knows to deprecate the currently stored transaction.

At step 510, components of the system, such as the accountability system 108, in response to receiving the indication, decrements or adjusts the first count to generate a second count. In certain embodiments, the accountability system 108 then generates a second set of conditions that includes the second count.

At step 512, components of the system, such as the accountability system 108, generates a second transaction using the information and the second set of conditions. The generation of the second transaction may follow a similar process as described with respect to step 504.

At step 514, components of the system, such as the accountability system 108, transmits the transaction to be stored in the blockchain ledger. Once the second transaction is stored, a requester requesting information about the user will be provided with the information from the most recent transaction—which is the second transaction.

In certain embodiments, once the count is depleted and a transaction with zero count or a pre-determined number is stored on the blockchain ledger, the requester can no longer access the information stored in the transaction, since the transaction has no remaining count credits to satisfy the requirement of having sufficient count credits for the releasing the information. In certain embodiments, the count is decremented or adjusted by a number that is determined based on one or more of the trustworthiness of the user, the trustworthiness of the requester, location of the request, and time of the request. In certain embodiments, a transaction termination indicator may be included inside the new transaction block to terminate any further access to the information stored inside the transaction.

It should be appreciated that the specific steps illustrated in FIG. 5 provide a particular process of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 500.

A computer system as illustrated in FIG. 6 may be incorporated as part of the previously described entities shown in FIGS. 1-5. For example, computer system 600 can represent some of the components of the user device 200 that displays the user interface 112, the pooling system 106, the accountability system 108 and the blockchain nodes 114*a-c*. In addition, the computer system of FIG. 6 may also disclose mobile devices and/or the computer systems discussed in this application. FIG. 6 provides a schematic illustration of one embodiment of a computer system 600 that can perform the methods provided by various other embodiments, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 may also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 may also include a transceiver 650 for transmitting and receiving messages. The transceiver 650 may comprise components, such as a transmitter and a receiver which are combined and share common circuitry or a single housing or may be separate. The transceiver 650 may be modified to communicate with one or more network configurations, such as GSM, a CDMA, a WCDMA, a CMDA2000 1×RTT, or a LTE network.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computer system such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635.

Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. Computer readable storage medium does not refer to transitory propagating signals. In an embodiment implemented using the computer system 600, various computer-readable media might be involved in providing instructions/code to processor(s) 610 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments described herein. Also, a number of steps may be undertaken before, during, or after the above elements are considered. Accordingly, the above description does not bound the scope of the claims.

What is claimed is:

1. A method, comprising:
   receiving, by a system comprising a processor, information associated with a user identity and a first condition, wherein satisfying the first condition controls access to the information, and the first condition comprises:
      a predetermined number of accesses of the information allowed by requesters, and
      a first count that tracks accesses of the information;
   generating, by the system, a first transaction using the information and the first condition, wherein generating the first transaction comprises:
      converting the first condition to a first set of instructions according to a blockchain programming model,
      encrypting the information associated with the user identity to generate encrypted information, and
      generating the first transaction using the encrypted information and the first set of instructions;
   storing, by the system, the first transaction in a blockchain ledger;
   in response to determining that the first transaction has been accessed by a requester of the requesters that satisfies the first condition, adjusting, by the system, the first count by a quantity to generate a second count, wherein the second count is based on the requester accessing the first information and the system generating a second condition that is based on the second count, and wherein the quantity is adjusted based on a trustworthiness of the requester;
   generating, by the system, a second transaction using the information and the second condition; and
   storing, by the system, the second transaction in the blockchain ledger.

2. The method of claim 1, further comprising, in response to the second count being a number indicative of the predetermined number of accesses being depleted, blocking, by the system, the access to the information.

3. The method of claim 1, wherein the quantity is further based on at least one of a location of the requester, a number of requests for the information from the requester in a defined period of time, or a time of a request for the information from the requester.

4. The method of claim 1, wherein the information comprises at least one of age, date of birth, location of birth, gender, address, education, family tree, medical history, psychiatric evaluations, psychologist evaluations, allergies, health records, personal identifiers, social security information, license numbers, government issued personal identifying numbers, financial accounts, credit scores, digital certificate for insurance proof, or digital proof for credit score.

5. The method of claim 1, wherein the first condition further comprises at least one of a geographical condition, or a temporal condition.

6. The method of claim 1, wherein the information is encrypted using at least one portion of the first condition.

7. The method of claim 1, wherein the blockchain ledger comprises groups of blocks comprising respective transactions.

8. A system, comprising:
   a processor; and
   a memory that stores executable instructions that, when executed by the processor, facilitate performance of operations, comprising:
      receiving information associated with a user identity and a first condition, wherein satisfying the first condition controls access to the information, and the first condition comprises:
         a predetermined number of accesses of the information allowed by requesters, and
         a first count for tracking accesses of the information generating a first transaction using the information and the first condition,
      wherein generating the first transaction comprises:
         converting the first condition to a first set of instructions according to a blockchain programming model,
         encrypting the information associated with the user identity to generate encrypted information, and
         generating the first transaction using the encrypted information and the first set of instructions;
      storing the first transaction in a blockchain ledger;
      in response to determining that the first transaction has been accessed by a requester of the requesters that satisfies the first condition, adjusting the first count by a quantity to generate a second count, wherein the second count is based on the requester accessing the information and the system generating a second condition that comprises the second count, and wherein the quantity is modified based on a trustworthiness of the requester;
      generating a second transaction using the information and the second condition; and
      storing the second transaction in the blockchain ledger.

9. The system of claim 8, wherein the operations further comprise, in response to the second count being a number indicative of the predetermined number of accesses being depleted, blocking access to the information.

10. The system of claim 8, wherein the quantity is based on at least one of a location of requester, a number of requests for the information from the requester in a defined period of time, or a time of a request for the information from the requester.

11. The system of claim 8, wherein the information comprises at least one of age, date of birth, location of birth, gender, address, education, family tree, medical history, psychiatric evaluations, psychologist evaluations, allergies, health records, personal identifiers, social security information, government issued personal identifying numbers, license numbers, financial accounts, credit scores, digital certificate for insurance proof, or digital proof for credit score.

12. The system of claim 8, wherein the first condition further comprises at least one of an expiration time condition applicable to the information, or a geographical condition.

13. A non-transitory machine-readable medium, comprising executable instructions that, when executed by a processor of a system, facilitate performance of operations, comprising:
   receiving information associated with a user identity and a first group of conditions, wherein satisfying the first group of conditions controls access to the information, and the first group of conditions comprises:
a predetermined number of accesses of the information allowed by requesters, and
a first count for tracking accesses of the information;
generating a first transaction using the information and the first group of conditions, wherein generating the first transaction comprises:
converting the first group of conditions to a first set of instructions according to a blockchain programming model,
encrypting the information associated with the user identity to generate encrypted information, and
generating the first transaction using the encrypted information and the first set of instructions;
storing the first transaction in a blockchain ledger;
in response to determining that the first transaction has been accessed by a requester of the requesters that satisfies the first group of conditions, adjusting the first count by a quantity to generate a second count, wherein the second count is based on the requester accessing the first information and the system generating a second group of conditions that that is a function of the second count, and the quantity is altered based on a trustworthiness of the requester;
generating a second transaction using the information and the second group of conditions; and
storing the second transaction in the blockchain ledger.

14. The non-transitory machine-readable medium of claim 13, wherein the quantity is further based on at least one of a location of the requestor, a number of requests for the information from the requestor in a defined period of time, or a time of a request for the information from the requestor.

15. The non-transitory machine-readable medium of claim 13, wherein the information comprises at least one of age, date of birth, location of birth, gender, address, education, family tree, medical history, psychiatric evaluations, psychologist evaluations, allergies, health records, personal identifiers, social security information, license numbers, government issued personal identifying numbers, financial accounts, credit scores, digital certificate for insurance proof, or digital proof for credit score.

16. The non-transitory machine-readable medium of claim 13, wherein the first group of conditions further comprises at least one of an expiration time condition for the information, a geographical condition, or a temporal condition.

17. The non-transitory machine-readable medium of claim 13, wherein the information is encrypted using at least one portion of the first group of conditions.

18. The non-transitory machine-readable medium of claim 13, wherein the blockchain ledger comprises groups of blocks comprising respective transactions.

19. The system of claim 8, wherein the information is encrypted using at least one portion of the first condition.

* * * * *